Feb. 11, 1958 C. D. SOUTHARD 2,822,979

COUNTING AND DIVIDING CIRCUIT

Filed Nov. 18, 1954 2 Sheets-Sheet 1

INVENTOR.
CARL D. SOUTHARD

BY [signature]

AGENT

United States Patent Office 2,822,979

Patented Feb. 11, 1958

2,822,979

COUNTING AND DIVIDING CIRCUIT

Carl D. Southard, Endicott, N. Y., assignor to International Business Machines Corporation, New York, N. Y., a corporation of New York Application November 18, 1954, Serial No. 469,582

17 Claims. (Cl. 235—61)

Figure 1A:
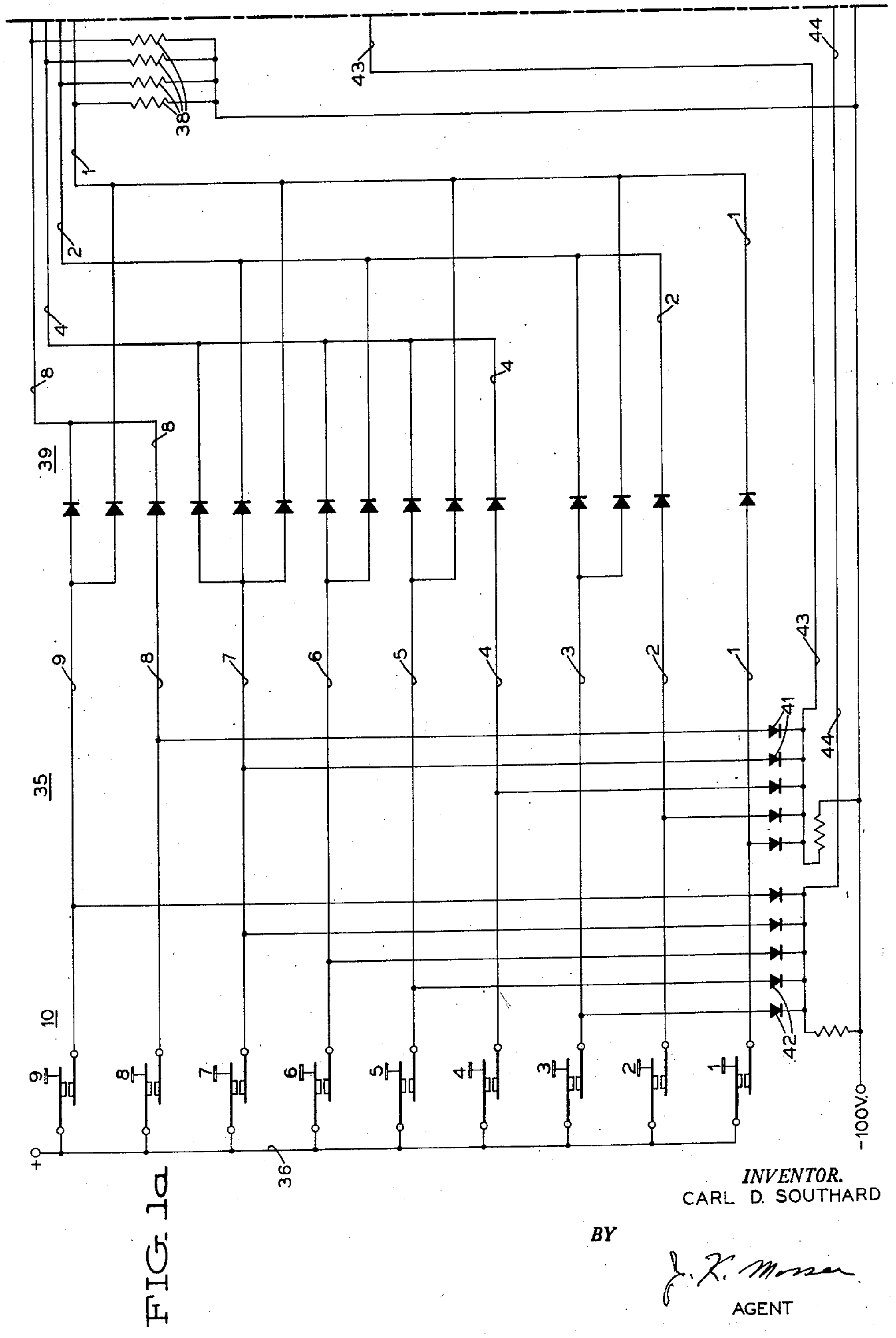

This invention relates to a counting circuit and more particularly to a means for determining a remainder for a collection or word of numbers or binary coded values based on a predetermined modulus.

It is one of the objects of this invention to provide a means for determining a remainder for a collection of digits or binary coded values based on a predetermined modulus which requires a relatively few number of elements.

Previously suggested means for counting and dividing on a predetermined modulus to determine a bit count remainder for a group of binary or numeric digits involves relatively complicated and complex circuits which are both costly and troublesome to maintain and service.

In the present invention the bit count remainder of any collection of numbers or binary coded values based on modulo 4 is determined by means of 3 bit count triggers and includes relatively simple circuitry to interconnect two of the triggers and then interconnect the remaining trigger with one of the first two at predetermined intervals.

In the proposed arrangement the number of digits to be transmitted to a suitable receiver or utilization device is expressed in binary code and the bit count value for each digit is directed to either a 1 or a 2 bit trigger counting and dividing circuit, dependent upon the bit count value of each digit. Each of these circuits operates independently during the bit counting operation and, for example, when based on modulo 4, each circuit operates to individually and automatically divide or cancel its accumulated bit count therein whenever the next bit count value received brings the total to a value divisible by 4. At the completion of the delivery of a word or collection of digits, the section of the 1 bit circuit wherein accumulated 2 bits may be stored is connected to the 2 bit count circuit and conducts therethrough to either add a 2 bit value thereto or cancel the stored 2 bit value therein. Each bit count circuit includes a bit count remainder line connected to a receiver in any suitable manner and over which the bit count remainders, if any, are transmitted. These values are used for comparison or checking with a bit count remainder generated at a second source in accordance with the data received. This insures that the data received agrees with that transmitted.

Accordingly, it is another object of the invention to provide 1 and 2 bit counting circuits which are independently operated in accordance with the bit count value assigned to the digit transmitted to a receiver.

It is yet another object of the invention to provide independently operated 1 and 2 bit counting circuits which divide modulo 4 to provide independent bit count remainders in each circuit.

It is still another object to provide an improved bit counting circuit having independently operated 1 and 2 bit counting circuits in which a portion of the former is interconnected with the latter at the end of the delivery of a collection of binary digits to provide a bit count remainder over at least one of the bit count remainder lines, if any.

It is another object of the invention to provide an improved bit count generating and dividing circuit based on modulo 4 which is adapted to transmit any remainder therefrom for comparison with a bit count remainder generated at a remote location.

Other objects of the invention will be pointed out in the following description and claims and illustrated in the accompanying drawings, which disclose, by way of example, the principle of the invention and the best mode, which has been contemplated, of applying that principle.

Figure 1B:
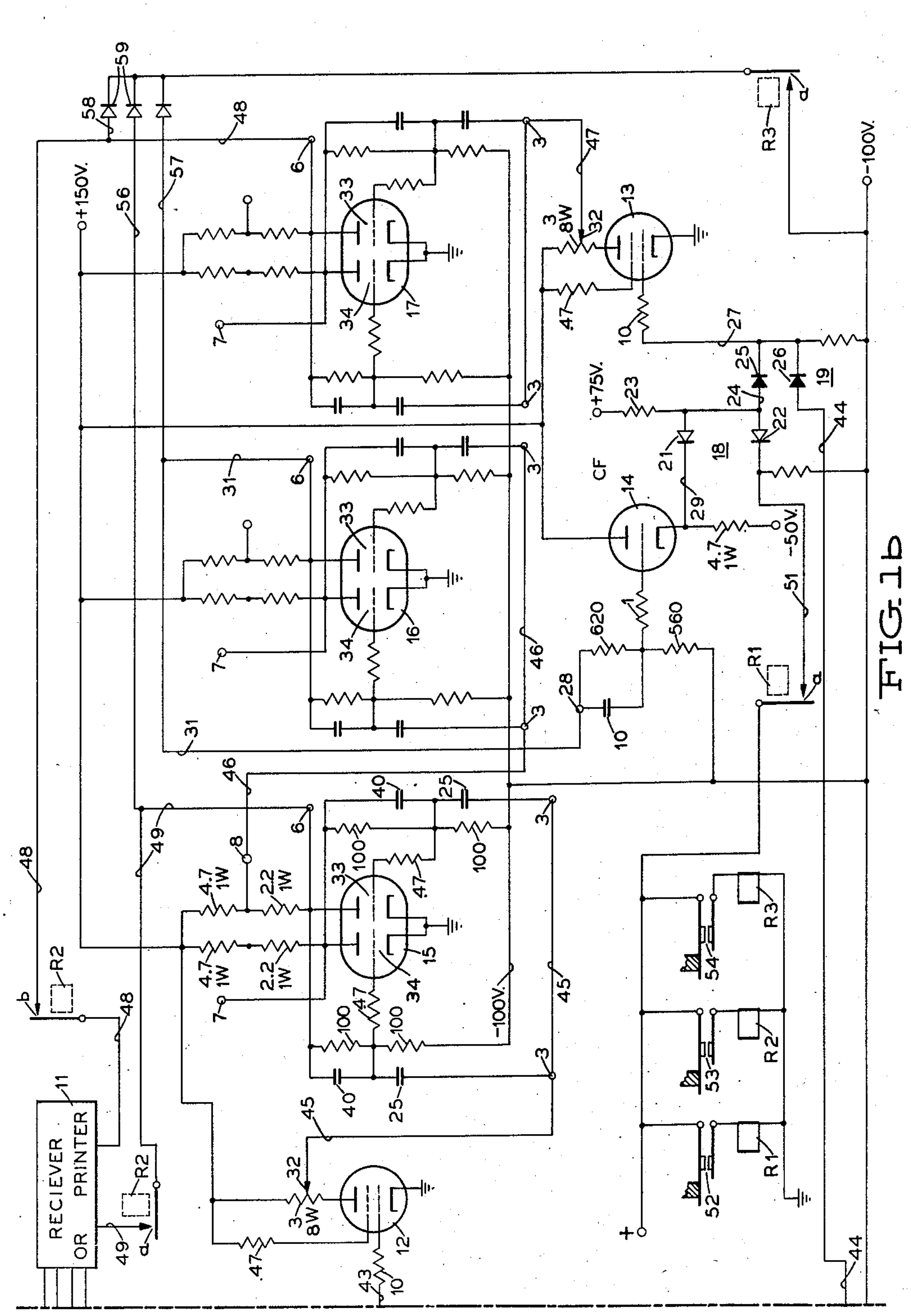

In the drawings:

Figs. 1*a* and 1*b* taken together, with Fig. 1*b* to the right, show the improved bit count generating and dividing circuit with operating means therefor.

*General description*

Referring now to the drawings for a more detailed description of the improved bit count generator and dividing circuit, there is shown, by way of example, a means 10, Fig. 1*a*, in the form of a plurality of keys representing digit values 1 through 9 which may be depressed to complete electrical circuits to transmit numeric values in binary 1–2–4–8 code in the form of an electrical pulse or combination of pulses to any suitable receiver 11, Fig. 1*b*. One form of such a receiver suitable for processing the numeric data transmitted, represented as pulses, is shown and described in O. B. Shafer et al. application, Serial No. 469,592, filed November 18, 1954, and assigned to the assignee of the present invention. It is to be understood, however, that neither the particular receiving apparatus 11 nor sending apparatus 10, Fig. 1*a*, forms any part of this invention in that any suitable means may be provided.

In this particular embodiment the actual bit count generating and dividing circuits comprise a relatively few number of elements. Referring to Fig. 1*b*, these elements include a first or 1 bit power amplifier or inverter 12, a second or 2 bit power amplifier or inverter 13, a cathode follower 14, two 1 bit count triggers 15 and 16, a 2 bit count trigger 17, a diode switch or "and" circuit 18 and a diode mixer or "or" circuit 19. The remaining elements shown merely provide the means for conducting pulses to and from the circuits.

*Circuit components*

In the drawings of the various control elements, the individual components or units making up that element are indicated merely as diagrammatic representations to be presently described as applied to various typical forms of tubes and diode circuits.

The diode switch 18, Fig. 1*b*, is shown as a typical coincidence switch otherwise known as a logical or "and" circuit and comprises germanium crystal diodes 21 and 22. A terminal of each diode is commoned to provide an output connected through a voltage dropping circuit 23 to a positive 75 volt source and to an output conductor 24. Each diode includes an individual input terminal which is normally biased negative through a separate resistor so that the commoned terminals are normally at a negative potential with respect to ground. If coincident positive pulses are applied to both input terminals, the potential of the commoned terminals and the conductor 24 is raised to cause operation in a manner to be hereinafter described. However, if only one of the input terminals is pulsed positively, the potential of the commoned terminals is not raised appreciably. While in the diagram only two germanium crystal diodes and input terminals are shown, it is to be understood there may be more than two diodes incorporated in the diode switch 18, if desired or deemed necessary. With any suitable number, the switch operation is identical when positive coincidence occurs at each input terminal.

The diode mixer 19 shown is a typical mixer and is otherwise known as a logical "or" circuit. This mixer comprises a pair of germanium crystal diodes 25 and 26, respectively, and for the purposes of this description are shaded and the direction reversed, in the present drawings, to distinguish them from the diodes which are employed in the switch 18. The output terminals of the diodes are commoned to a conductor 27 for transmitting pulses thereover, as will be hereinafter described, and in turn is connected by a suitable resistor to a negative 100 volt source which normally maintains a negative bias on this line. Each diode includes an individual input terminal which in turn is connected to the electrical circuit at the selected points. If either one or both of the diode input terminals is pulsed positively, the potential of the output terminals or sides raises which is reflected over the associated conductor 27. As in the diode switch diagram, it is to be understood, the diagram representation of the diode mixer may involve more than two diodes and input terminals. However, each additional diode will be provided with an additional conductor leading to a circuit, and that the cathode of each of these additional diodes will be connected to the commoned terminals.

The remaining diode mixers or "or" circuits shown in the drawings, Fig. 1*a*, and to be described later operate in an identical manner. Structurally, the diodes in both the switch and mixers are the same. It is the positioning or orientation of the cathode side which determines a mixer or switch circuit.

Before proceeding with a description of the various control circuits or devices of the bit counting and dividing circuits, a brief description of representative tubes or components will be given. The values of the various resistors utilized therein are labeled in thousands (K) of ohms, while the values of various capacitors are indicated in micro-microfarads. Hereinafter, in this specification wherein a conductor or a circuit terminal or the like is referred to as being shifted positive or negative in potential, this does not necessarily mean the point, in question, is positive or negative in the absolute sense but only more positive or more negative relative to its previous state. This principle also applied to any description wherein positive and negative pulses are mentioned.

The cathode follower 14, Fig. 1*b*, comprises a triode vacuum tube. In actual practice this may be a dual triode —type 5965. The grid of the triode is connected in series through a 1K ohm and a series 560K ohm resistor to a negative 100 volt supply. The cathode is connected through a 4.7K ohm, 1 watt resistor to a negative 50 volt supply and the anode or plate is directly connected to a positive 150 volt supply in the standard manner. The 1K ohm resistor of the triode is also connected to a terminal 28 through a 620K ohm resistor in parallel with a 10 micro-microfarad condenser, to provide a voltage level establishing network. The output of the triode conducts over a conductor 29 connected to the cathode side of the 4.7K ohm resistor. The input terminal 28 is connected to a conductor 31 leading to the right plate side of the trigger 16 for reasons to be hereinafter explained. This conductor 31 is either at a positive potential of approximately 150 volts or positive approximately 50 volts. With positive 150 volts on terminal 28, the associated grid is maintained at such a potential that the tube current is at a maximum and accordingly the cathode conductor 29 is at a maximum positive potential of plus approximately 25 volts. With a positive 50 volts on the terminal 28, the associated grid is maintained at such a potential that the tube current is at a minimum and accordingly the cathode conductor 29 is at a minimum negative potential of approximately minus 18 volts. Thus, a shift of potential on the terminal 28 effects a corresponding in-phase shift of potential at the output conductor 29. This well-known type of tube action is referred to as cathode follower action.

It will be noted that the cathode resistor of the triode is of relatively low value. As a result, the cathode output terminal serves as a low impedance signal source. A low impedance signal source may be "loaded" appreciably without substantially affecting the magnitude of the signals supplied therefrom. This is the main purpose of a cathode follower unit. The capacitor, shunting the 620 input resistor, is to rapidly apply the voltage shift of the input terminal 28 to the grid, so that the resultant shift in potential on the conductor 29 does not appreciably lag the input voltage.

Referring to the inverters or amplifiers units 12 and 13, these each comprise a pentode—type 6AQ5, having their cathodes connected to ground and their plates connected to the positive 150 volt source through a 3K ohm 8 watt resistor. A .47K ohm grid current limiting resistor is included in the screen grid circuit and a 10K ohm current limiting resistor is disposed in the grid circuit. An inverter, as its name implies, is adapted to simply invert a signal. Thus, if the grid circuit shifts positive, the pentode conducts more heavily and the associated tap output 32 on the 3K resistor shifts negative. Similarly, if the grid circuit shifts negative the potential at the tap shifts positive.

Referring now to the trigger units 15, 16 and 17, these are conventional in construction and each comprises two retroactively coupled triode sections 33 and 34, respectively, of a type 5965 vacuum tube. By proper selection of circuit components, each unit is so arranged that only one of its triode sections is conductive at a time in accordance with the well-known trigger operation. Since each trigger is basically identical, the operation of only one will be described. As shown, each side of the trigger includes a cathode connected to ground and each plate is connected to the positive 150 volt potential in series with a 1 watt 4.7K ohm resistor and a 1 watt 2.2K ohm resistor. Each grid is provided with a .47K ohm grid current limiting resistor which is fed through a paralleled 100K ohm resistor and 25 mmf. condenser or a 100K ohm resistor and paralleled 40 mmf. condenser. The former elements are connected to the negative 100 volt potential and control circuit, respectively, while the latter elements are connected to the plate circuit of the opposite sides of the triode. These combinations of elements provide a voltage level stabilizing network for proper operation.

With the right-hand triode 33 conducting, the trigger is defined as being in an "off" position. With the trigger "off," the plate terminal 6 and tap terminal 8 of the right-hand triode 33 are at some potential below the positive supply potential of 150 volts due to the current being drawn through the right-hand triode. As a result, voltage sensitive circuits which may be connected to terminals 6 and 8 are accordingly controlled. With the trigger "off," as assumed, the plate of the nonconducting left-hand triode 34 and thus the terminal 7 is at the positive supply potential of approximately 150 volts.

If a negative going waveform or pulse is applied to input terminals 3, the grid of the right-hand triode 33 starts to shift negative. As a result, this triode is rendered less conductive. The resultant positive shifting of its plate is applied, through the 40 micro-microfarad condenser, to the grid of the left-hand triode 34 and renders this triode conductive. The resultant negative shifting of the plate of the left-hand triode is then applied, through its associated 40 micro-microfarad condenser, to the grid of the right-hand triode 33 and renders it less conductive. With the right-hand triode less conductive, the left-hand triode is rendered more conductive. This retroactive action between the left and right-hand triodes continues until the left-hand triode 34 is fully conductive and the right-hand triode 33 is nonconductive. This retroactive action is very rapid, so that in effect, the application of the negative shift to terminal 3 almost instantaneously initiates the "flipping" of conduction from the right to the left-hand triode. When the left-hand triode 34 conducts, the trigger is defined as being in an "on" condition. With the trigger "on," the plate of the left-hand triode 34 is at a low potential, while the plate terminals 6 and 8 of the right-hand triode are at a positive 150 volts. As the shift of potential at terminals 6 and 8 occurs, associated circuits are accordingly controlled as will be later described.

The triggers are flipped or triggered from their "off" to "on" and "on" to "off" positions by applying a negative voltage shift to the grid input terminals 3 of the left-hand triode. By design, the trigger unit is insensitive to positive voltage shifts applied to the terminals 3. Thus, if the trigger is "on," it can not be shifted "off" by positively pulsing the grid of the right-hand or non-conductive triode 33 with the voltage levels used, but only by negatively pulsing the grid of the left-hand or conducting triode 34. This selective response to only negative pulses is effected by proper choice of bias potential. Resetting for all triggers to "off" position may be accomplished by biasing the right-hand side of each trigger negative in a manner to be described later.

Hereinafter, in this specification wherein a trigger is mentioned, the trigger is defined as being "off" if the right side triode 33 is conductive, or "on" if the left side triode 34 is conductive.

In the foregoing description of the tubes, it is to be understood the resistors and capacitors may be varied within limits or even different type tube circuits employed. Also, voltages may be varied within limits or levels used other than specified by changing affected component values. These figures are merely presented as a means for accomplishing the desired result.

*Translator*

Referring now to Fig. 1*a*, a suitable means in the form of a decimal to binary coded decimal translator 35 includes the decimal digit keys 1 through 9 which have their respective operating points connected to a common conductor 36 leading to a positive voltage source. The opposite side of each contact is connected to a separate decimal conductor or line leading to one or more diodes in a diode mixer array or "or" circuit arrangement 39. As shown, the output of each diode in the decimal lines is connected in the proper manner to a plurality of parallel lines to provide binary 1–2–4–8 code values. These binary lines are normally biased negative by the negative 100 volt line through related resistors 38. Thus, whenever a circuit is completed at one of the contacts 1 through 9 that line is connected to the positive voltage source and conducts through its related diode or diodes to translate the decimal value to a binary positive pulse or combination of positive pulses. These pulses are conducted to the receiver or utilization device 11, Fig. 1*b*, for use in any suitable manner.

Between the decimal contacts and diodes in the decimal conductors are selectively connected a pair of diode mixers 41 and 42, respectively, Fig. 1*a*, having assigned 1 and 2 bit values. Each decimal value is assigned a bit value in accordance with the code, that is, the decimals 1, 2, 4 and 8 are assigned 1 bit values, the decimals 3, 5, 6 and 9 are assigned 2 bit values and the decimal 7 is assigned a 3 bit value. Thus, the 1 bit diode mixer 41 includes five diodes connected respectively to the decimal 1, 2, 4, 7 and 8 lines, and the 2 bit diode mixer 42 includes five diodes connected respectively to the decimal 3, 5, 6, 7 and 9 lines. The commoned sides of both diode mixers are biased negative in the usual manner. The output from the 1 bit mixer 41 is directly connected by means of a conductor 43 to the grid of the first or 1 bit inverter 12, Fig. 1*b*, and the output from the 2 bit diode mixer 42, Fig. 1*a*, extends over a conductor 44 through the diode mix or "or" circuit 19, Fig. 1*b*, whose output in turn is connected to the grid of the second or 2 bit inverter 13 by means of the conductor 27.

*Tube circuit arrangement*

As shown, the plates of the inverters 12 and 13, Fig. 1*b*, are connected to the positive 150 volt source in the usual manner and, as mentioned previously, each inverter includes a screen grid connected to the 150 volt source through an appropriate .47K ohm resistor. The output from the first or 1 bit inverter 12 extends from the tap 32 over a conductor 45 and is parallel capacity coupled to the 3 terminals of both sides of the first 1 bit trigger 15. The normally "off" or right-hand side 33 of the 1 bit trigger 15 includes the tap connection 8 in the plate circuit which has a conductor 46 extending therefrom parallel connected to the 3 terminals at both sides of the second 1 bit trigger 16 in the 1 bit counting circuit to provide a capacity coupling therefor.

The second or 2 bit inverter 13 is provided with the tap 32 in the plate circuit which is capacity coupled to the 3 terminals of the 2 bit trigger 17 by means of a conductor 47 in a manner identical to the inverter 12 for the first 1 bit trigger 15. The 6 terminal in the plate circuit of the normally "off" or right-hand side 33 of the trigger 17 includes a conductor 48 to provide a 2 bit count remainder line leading to the utilization device 11. Likewise, the 6 terminal of the first 1 bit trigger 15 includes a similar conductor 49 to provide a 1 bit count remainder line directly connected to the same device in parallel with the 2 bit remainder line 48.

Referring now to the second trigger 16 in the 1 bit counting circuit, it is noted the output at the 6 terminal in the plate circuit at the normally "off" or right-hand side 33 is secured to the conductor 31 leading, by way of the voltage level establishing device, to the grid of the cathode follower 14. As mentioned, this cathode follower has the tapped conductor 29 leading from the cathode side connected to the diode element 21 of the two element diode switch 18. The input side of the other element 22 of this diode switch is biased negative in the usual manner, and also includes a conductor 51 leading to a positive voltage source. This source supplies a positive potential to the second diode element 22 of the diode switch 18 when a contact 52 is closed to energize a relay coil R1 which in turn closes a contact R1*a* between the positive voltage source and the conductor 51. When this action occurs, it can be seen that if the cathode follower is conducting both diode elements 21 and 22 are positive. Thus, a positive potential is applied through the diode element 25 of the diode mixer 19 and over the conductor 27 to so bias the grid of the second or 2 bit inverter 13 to permit conduction. This conduction, of course, results in a negative going potential over the conductor 47 to operate the 2 bit trigger 17. In addition to the switch 52 for energizing the relay coil R1, there is provided a second switch 53 for selectively energizing a relay coil R2 which, when energized, is operative to close contacts R2*a* and R2*b* in the 1 and 2 bit count remainder lines 49 and 48, respectively. A third switch element 54 is also provided for selectively energizing a relay coil R3 to close relay contact R3*a* to connect the plates of the "off" sides of the three triggers 15, 16 and 17 to the negative 100 volt supply. This negative biasing for resetting the triggers 15, 16 and 17 to their respective "off" positions is accomplished by means of parallel connected conductors 56, 57 and 58, respectively, connected to the 6 terminals of the triggers through conductors 49, 31 and 48, respectively. Isolation diodes 59 are provided in each reset conductor to prevent back circuits.

While in the foregoing description the various relays with their individual contacts, the diodes, cathode followers and inverters are included in this circuit, it is to be understood that these elements are shown by way of example only. Other suitable means may be provided to accomplish the desired circuit operation. For example, the switches 52, 53 and 54 and relay coils R1, R2 and R3 could be readily substituted by using suitable electronic tubes under the control of suitable signals. In fact, in actual practice such a substitution would more likely be the case. The particular switching arrangement shown is provided to avoid undue complication and prevent obscuring of the invention herein set forth. In addition, the cathode follower 14 and inverters may be substituted for equivalent circuitry. Likewise, the decimal contacts or keys for setting up the binary code is merely shown by way of example and for all practical purposes suitable electronic pulsing means such as a storage device or the like would be provided rather than the keys shown.

The same reasoning applies to the receiver or utilization device 11 which could include one of many pieces of equipment in which it is desired to compare bit count remainders transmitted from a source.

In fact, in the Shafer et al. application referred to the bit count remainder actually precedes the delivery of each word of data, whereas in the disclosed embodiment the bit count remainder follows the delivery of the word. Therefore, the timing of the bit count handling means in the Shafer application would of necessity have to be reversed so that the apparatus may be receptive for the bit count after such a delivery of data rather than before the delivery. This, of course, may be readily accomplished by reversing the position of the bit count trigger in the gas tube matrix so that it conditions the bit count responsive gas tubes after the delivery of each word of data. Under these conditions the trigger for the first ordered position of each word would be reset "on" and the bit count trigger would follow the last ordered position in the closed ring cycle timing and be normally reset "off."

With this understanding in mind, it will be appreciated it is to the particular arrangement and interconnecting circuit control of the 3 bit count triggers that this invention is directed.

*Operation*

In order to obtain a complete understanding of the invention, a description of the operation of the bit counting and dividing circuit is as follows:

Assuming the circuit is in condition for handling the data to be transmitted, the various lines will be connected to their proper voltage sources as previously described, and the switches 52, 53 and 54 are in open circuit positions.

Under these conditions the three bit counting triggers 15, 16 and 17 are in their "off" positions which, in this instance, is when the right-hand side 33 of each is conducting. With these sides conducting the right-hand plate potentials are down, thus the conductors 31, 48 and 49 connected to their respective triggers are at a low or negative potential. Since the conductor 31 leading from the second 1 bit trigger 16 is down, the grid of the cathode follower 14 is at a low potential, therefore, this tube is nonconducting and the associated diode element 21 of the diode switch 18 is biased negative. In addition, the contact R1*a* is likewise open and the second diode element 22 in the diode switch 18 is also biased negative.

With the diode mixer 19 and the 1 and 2 bit count diode mixers 41 and 42, respectively, Fig. 1*a*, biased negative, the grids of both inverters 12 and 13, Fig. 1*b*, are negative also and therefore in their nonconducting state. Thus the potential on the respective conductors 45 and 47 leading from the tap 32 on the plate side of each inverter is at a high potential and this potential is applied to the 3 terminals of both sides of the first 1 bit and the 2 bit triggers 15 and 17, respectively. Since the circuit arrangement shown does not recognize a positive or high potential, the triggers will remain in their "off" position. Likewise, the conductor 46 leading from the 8 terminal tapped in the "off" side 33 of the first 1 bit trigger 15 to the 3 terminals of the second 1 bit trigger 16 is at a low potential. Since the circuit does not recognize steady state conditions, this has no effect on the second trigger 16 in the 1 bit counting circuit, therefore, this trigger remains in its "off" position.

With the circuits in the above-described condition, data may be transmitted to the utilization device 11 and the bit count for this data may be gated through the proper diode mixers 41 or 42, Fig. 1*a*, for dividing modulo 4. For example, assuming a decimal 1 is to be transmitted to the receiver 11, the 1 contact is momentarily closed. This provides a positive potential pulse through its related diode over the binary 1 line and at the same time this positive potential is gated through the 1 bit diode mixer 41 over the conductor 43 to bias the grid in the 1 bit inverter 12, Fig. 1*b*, positive to permit conduction through the same. As this inverter 12 conducts, the potential at the tap connection 32 drops and in so doing applies this negative going potential over the conductor 45 to the 3 terminal at the right side 33 of the trigger 15 to cut off conduction. Such action turns the trigger 15 "on," that is, the left-hand side 34 now conducts and the plate potential at the right-hand side 33 increases. This represents a 1 bit value and the line 49 leading from the tap 6 on the right-hand plate side 33 increases in potential to indicate a 1 bit count remainder. This increased right-hand plate potential is also reflected along the conductor 46 leading from the tap 8 to the 3 terminals of the second 1 bit trigger 16 to condition the same for operation. It is to be noted the gated pulse from the decimal 1 line is directed to the first 1 bit trigger 15 in the 1 bit count circuit exclusively and that the remaining portions of the 1 bit count circuit and the 2 bit count circuit remain in their normal positions.

Assuming the decimal 2 key is actuated next, Fig. 1*a*, the positive pulse is transmitted over its related decimal line, conducts through the related diode in the array 39 and this pulse is transmitted over the binary 2 line to the receiver 11 in the same manner. At the same time the 2 line, having a bit count value of 1, conducts through the 1 bit diode mixer 41 over the conductor 43 to the 1 bit inverter 12, Fig. 1*b*, to again cause this tube to conduct. This conduction decreases the positive potential applied over the line 45 to turn the 1 bit trigger 15 from its "on" to its "off" position. As this occurs the 1 bit count remainder line 49 leading to the receiver 11 goes negative, indicating that a 1 bit is no longer stored in the trigger 15.

Simultaneously with this action the conductor 46 in going negative triggers the second 1 bit trigger 16 to its "on" position which indicates a total count of two 1 bits. As this trigger turns "on," the conductor 31 leading from the terminal 6 at the plate of the "off" side increases in potential to bias positive the grid of the cathode follower 14 and permit conduction therethrough, which in turn applies a positive potential to the element 21 of the 2 element diode switch 18. However, since the second element 22 of this diode switch is biased negative due to the open contact R1*a*, this positive value, indicating a 2 bit value, is not transmitted therethrough to the second or 2 bit inverter 13. Under these conditions, it can be seen that a total of two 1 bit counts has been applied to the 1 bit counting or dividing circuit which is stored in the second 2 bit trigger 16.

Assuming now that the decimal 3 contact, Fig. 1*a*, is momentarily closed, the positive pulse conducted over the related decimal line is divided by its associated pair of diodes in the diode mixer array 39 to condition both the 1 and 2 binary lines with a positive pulse. Since the decimal 3 represents a 2 bit value, the tap in this circuit gates this positive pulse through the 2 bit diode mixer 42 over the conductor 44, through the diode element 26, Fig. 1*b*, of the diode mixer 19 and conductor 27 to bias positive the grid of the 2 bit inverter 13. As this tube conducts, the negative going potential impressed on the conductor 47 leading from the plate circuit at the tap 32 operates to reduce the potential on the grid at the right side 33 of the 2 bit trigger 17, which turns the same "on" in the standard manner. As the 2 bit trigger turns "on,"

the potential of the plate circuit at the "off" side 33 and the conductor 48 increases to indicate a 2 bit count remainder stored in the 2 bit count trigger 17. It can be seen that under the conditions set forth, a total of four bits have been transmitted to and stored in the bit count dividing circuit, that is, the 2 bit trigger 17 is "on," the first 1 bit trigger 15 is "off" and the second 1 bit trigger 16 is "on."

Should the decimal 4, Fig. 1*a*, contact be now closed, this permits conduction through its related diode to the binary 4 line in the usual manner and this positive pulse is gated through the 1 bit mixer 41 to the 1 bit inverter 12, Fig. 1*b*, which provides a negative going pulse over the conductor 45 to turn the 1 bit trigger 15 "on." As this trigger turns "on," the 1 bit count remainder line 49 goes positive along with the conductor 46 and the second 1 bit trigger 16 remains "on." Thus, a total of five bits have now been accumulated in the circuit. That is, a 1 bit in the trigger 15, two 1 bits in the trigger 16 and one 2 bit in the trigger 17.

If the decimal 8 contact is closed next, Fig. 1*a*, the decimal 8 line conducts through its related diode in the usual manner directly over the binary 8 line and this pulse is likewise gated to the 1 bit inverter 12, Fig. 1*b*, which drops the potential on the conductor 45 to turn the first 1 bit trigger 15 from its "on" to its "off" position. This action drops the potential on the 1 bit count remainder line 49 leading to the receiver 11 indicating a 0 value and at the same time the conductor 46 drops in potential to turn the second 1 bit trigger 16 from its "on" to its "off" position. The turning of the second trigger 16 "off" drops the potential on the conductor 31 leading to the grid of the cathode follower 14 to stop conduction. Thus, with both of the 1 bit triggers "off" the output conductors 49 and 31 leading from the 1 bit counting and dividing circuit are negative and this indicates a 0 bit count remainder. In the examples set forth above, it can be seen a total of six bits have been directed to the bit count dividing circuits, and that the four 1 bit values have been divided independently of any 2 bit value stored to provide a 0 bit count remainder over the 1 bit remainder line 49. Under these conditions the 2 bit trigger 17 is the only one "on" and indicates a bit count remainder of 2. From the foregoing it can be readily seen each 1 bit count value is fed to the trigger 15 which, at the end of each second operation, operates to actuate the trigger 16 and that upon the reception of every fourth 1 bit pulse, both 1 bit triggers are always turned "off." This provides the dividing means based on modulo 4.

Should the decimal 5, 6 or 9 key be next depressed, Fig. 1*a*, its respective line conducts through the related diodes to selectively condition the proper two of the binary coded lines and gate a pulse through the 2 bit diode mixers 42 to operate the 2 bit inverter 13, Fig. 1*b*, in the manner previously described. This action, as previously mentioned, operates to turn the 2 bit trigger 17 from its "on" to its "off" position and in so doing drops the potential on the 2 bit count remainder line 48 leading to the receiver 11. Since a total of eight bits have now been transmitted to the bit counting and dividing circuits, four 1 bit values and two 2 bit values, it can be readily seen the bit count remainder is 0 for both when based on modulo 4, and, as mentioned previously, with 0 bit count remainders, both the 1 and 2 bit count remainder lines 49 and 48, respectively, are at negative values. Here again it is to be noted that up to this point the 1 bit count triggers 15 and 16 and the 2 bit count trigger 17 operate independently.

In the foregoing description, while the 2 bit trigger 17 merely operates from "off" to "on" and "on" to "off" counting single 2 bit pulses and is actually dividing modulo 2, these pulses have weighted values of 2 to provide in effect a division modulo 4.

A decimal 7 pulse is conducted over its decimal line through its respective diodes in the mixer array 39, Fig. 1*a*, to the binary 1, 2 and 4 lines in the standard manner. Since this number has a 3 bit value, the pulse is directed through both the 1 and 2 bit mixers 41 and 42 simultaneously to operate their related inverters 12 and 13, respectively, Fig. 1*b*, to step the related bit count triggers 15 and 17 to their next "on" or "off" positions.

While just a relatively few values have been given, it is to be clearly understood that as long as the decimal circuits are consecutively pulsed, the 1 and 2 bit counting triggers are operated in accordance with the proper bit count values and they will each individually divide modulo 4, the 1 and 2 bit values, respectively.

Assuming for example a word has N number of digits or ordered positions, the bit count dividing triggers will be pulsed N times, plus 1 for each decimal 7. This intermittent or consecutive operation of the triggers is not transmitted to the receiver 11 because the contacts R2*a* and R2*b* in the bit count remainder lines 49 and 48, respectively, are open. However, the bit count remainder values, if any, are stored in the circuits until desired.

After the delivery of any given number of digits, it is necessary to transmit the bit count remainder thereof to the receiver 11 for comparison. For the purposes of this description it will be assumed, in this example, a total of 3 bits remains in the 1 bit dividing circuit and that the 2 bit trigger is "on," indicating a 2 bit value stored therein. This indicates a total of 5 bits in both circuits. Under the above assumed conditions, both 1 bit triggers 15 and 16 are "on" and the 1 bit count remainder line 49 and the conductor 31 leading from the second 1 bit trigger 16 is positive, therefore, the cathode follower 14 is conducting and a positive potential is applied to the first diode element 21 of the diode switch 18. Also, the 2 bit count remainder line 48 is positive. As the contact 52 is closed in any suitable manner to energize relay R1 which in turn closes contact R1*a*, a positive potential is applied to the second diode 22 of the 2 element diode switch 18 to permit the same to conduct.

As the contact R1*a* closes the diode switch 18 which now conducts operates the 2 bit inverter 13 to drop the potential on the conductor 47 leading to the 2 bit trigger 17 to turn the same from its assumed "on" position to its "off" position. Thus, the two 1 bit values stored in the second 1 bit trigger 16 are directed to the 2 bit trigger 17 to divide or cancel the 2 bit value stored therein. As the 2 bit trigger 17 turns to its "off" position, the 2 bit remainder line 48 drops in potential. Thus, it can be readily seen that only a 1 bit count remainder remains in the trigger circuits and this is indicated by the positive potential on the 1 bit count remainder line 49 leading from the 1 bit trigger.

After the contact R1*a* closes to test for any stored two 1 bit values in the 1 bit count circuit, the contact 53 closes to energize relay R2 which in turn closes contacts R2*a* and R2*b* to connect the 1 and 2 bit count remainder lines 49 and 48 to the receiver 11 and it is at this time that the bit count remainder, if any, is actually transmitted for comparison in any suitable manner.

Should all of the triggers be "off," indicating a 0 bit count remainder, both bit count remainder lines 48 and 49 are down, and this data would be so handled in the receiver. If both the 1 and 2 bit triggers 15 and 17 are "on," indicating a 3 bit count remainder, both bit count remainder lines 48 and 49 are positive. If the 1 bit trigger 15 is "off" and the 2 bit trigger 17 is "on" at the time of the test, the 1 bit remainder line 49 is down while the 2 bit remainder line 48 is positive to indicate a 2 bit value. Likewise, if the condition of the 1 and 2 bit triggers 15 and 17 are reversed, the condition of the remainder lines is also reversed to indicate a 1 bit count remainder over the line 49.

Thus, from the above, it can be seen that a bit count remainder based on modulo 4 is simply indicated by the condition of the 1 and 2 bit count remainder lines 49 and 48, respectively.

Assuming now a total of 3 bits are stored in the 1 bit counting circuit and that the 2 bit count trigger 17 is in its "off" position, indicating a 0 bit count remainder therein. Under these conditions, both 1 bit triggers 15 and 16 are "on" and a total of 3 bits must be transmitted to the receiver 11, however, the second 1 bit trigger 16 which is storing two 1 bits is not directly connected to the receiver 11 as is the first 1 bit trigger 15. This stored 2 bit value is transmitted to the receiver in the following manner. With the second trigger 16 in the 1 bit circuit "on," the cathode follower 14 is conducting, as previously mentioned, and at the time the contact R1*a* closes a positive going potential causes the 2 bit inverter 13 to conduct and turn the 2 bit trigger 17 from "off" to its "on" position. As this trigger turns "on," the potential of the 2 bit remainder line 48 increases and conducts to the receiver 11 in the usual manner. Thus, the stored two 1 bit values in the 1 bit counting circuit are transmitted by way of the 2 bit trigger 17. However, under no conditions does the 1 bit value stored in the first 1 bit trigger 15 affect the resultant operation of the 2 bit trigger 17.

If, for example, the second 1 bit trigger 16 is in "off" position, the conductor 31 is negative, and biases the cathode follower 14 to its nonconducting state. This results in a negative bias on the diode element 21 in the diode switch 18. Thus, when the contact R1*a* is closed to apply a positive test pulse to the diode switch, transmission of this pulse is blocked and the 2 bit trigger 17 remains unchanged.

After the bit count remainder has been transmitted to the receiver 11 for proper processing, the contacts 52 and 53 are opened to reopen the contacts R1*a*, R2*a* and R2*b*. This prevents further influence on the receiver. However, in order to enable the bit count dividing circuits to correctly handle the next group or series of bits delivered from the source, it is necessary to reset all of the triggers to their "off" positions. This is accomplished by momentarily closing the contact 54 which energizes relay coil R3 to close contact R3*a*. With closure of this contact, a negative 100 volt potential is applied over the conductors 56, 57 and 58 to the "off" plate side 33 of all of the triggers which in turn provides a negative bias to all the grids of the "on" sides 34 to cut off conduction at this point, if any of them are in their "on" position. As the "on" sides are cut off, the "off" sides 33 begin to conduct to thus reset the bit counting circuits to 0. Upon opening of the contact R3*a*, the 1 and 2 bit counting and dividing circuits are in proper condition to receive the next group of bit count values. After again receiving and dividing bit counts for the next line or word of data, the bit count remainder is transmitted to the receiver 11 in an identical manner.

While this embodiment shows the bit count remainder lines 48 and 49 and the transfer line 31 connected to the 6 terminals of their respective triggers, indicating the "off" side, it is obvious that these conductors may be connected to their respective triggers at the "on" sides by means of the terminals 7 and that with proper values assigned the operation is identical. Under these conditions, however, the reset conductors 56, 57 and 58 may still be connected to the 6 terminals to provide the resetting operation.

From the foregoing it can be seen that a relatively simple counting or dividing circuit has been provided which has a relatively few number of elements when compared to previous attempts and that any number of ordered positions in a word may be quickly counted and automatically divided modulo 4. Also, that these bit count remainder values may be stored indefinitely in this circuit, if desired.

It is to be again emphasized that the invention disclosed herein resides in the particular arrangement for individually counting and dividing 1 bit values and 2 bit values, after which, when a net bit count remainder is desired, the 1 bit count storing trigger 16 in the 1 bit counting circuit is tested through the 2 bit trigger 17 to divide the stored two 1 bits, if any, with the remainder in the 2 bit trigger, if any, or to direct any stored two 1 bits through the 2 bit trigger to the 2 bit remainder line. The remaining circuitry shown is by way of example only and has no bearing on the invention.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A value counting circuit for dividing all digit values based on a predetermined modulus and storing the remainder after such division, comprising independent counting and dividing circuits, means for independently operating said circuits to accumulate and then divide values directed thereto on said predetermined modulus, each of said circuits being operative to cancel any carry based on said predetermined modulus, an output connection associated with one of said circuits to detect a predetermined value less than the predetermined modulus, and means associated with said output connection for selectively directing any undivided predetermined accumulated values in said one of said circuits through another of said circuits having like accumulatable values to divide the same on the predetermined modulus.

2. A value counting circuit for dividing all assigned numeric values based on a predetermined modulus and retaining any remainder, comprising a pair of independent counting and dividing circuits, means for independently operating said circuits to cancel all carries based on the predetermined modulus and provide independent remainders, remainder lines extending from each of said circuits, an output connection associated with one of said circuits to detect a predetermined value less than the predetermined modulus, and means associated with said output connection for selectively directing certain undivided predetermined values accumulated in said one of said circuits through the other of said circuits having like values to provide a remainder value for conduction over the related remainder line.

3. A value counting circuit for dividing all assigned values modulo 4 and retaining the remainder, comprising a pair of independent counting and dividing circuits, independently operated counting and dividing means in each of said circuits to accumulate and divide values directed thereto on said modulo 4, each of said counting and dividing means being operative to cancel any carry based on said modulus, a remainder line extending from each of said circuits, an output connection associated with one of said counting and dividing means to detect a predetermined count less than the predetermined modulus, means associated with said output for selectively directing a certain portion of the undivided accumulated values having a predetermined count less than modulo 4 in said one of said counting and dividing means through the other of said counting and dividing means having like values to add the same thereto, and means for testing said remainder lines for any remainder values stored in said circuits.

4. A numeric value counting circuit for dividing all assigned numeric values modulo 4 and storing any remainder, comprising means for translating said values to represent pulses, first and second independent counting circuits, means for gating said pulses to be counted to said one or both of said independent counting circuits in accordance with the predetermined value assigned to each, first and second independently operated counting and dividing means for each circuit to count and divide the pulses delivered to each circuit on said modulo 4, each of said means being operative to cancel any carry based on said modulus, an output remainder line extending from each of said counting and dividing means, a second output extending from a section of said first independently operated counting and dividing means to conduct undivided half modulo 4 accumulated values stored therein, intermittently operated means for connecting said second output from said first counting and dividing means for conducting the undivided accumulated half modulo 4 values therein to the input of said second circuit, said conducted values being effective to divide the accumulated values, if any, in said second counting and dividing means on said modulo 4, and means for testing said output remainder lines for any stored remainders in both circuits.

5. A numeric value counting circuit for dividing all assigned numeric values modulo 4 and storing any remainder, comprising means for translating said values in the form of pulses having 1 and 2 bit values, a 1 bit counting circuit, a 2 bit counting circuit, means for gating the 1 and 2 bit pulses to be counted to the 1 and 2 bit counting circuits, respectively, means for independently storing and then dividing the 1 and 2 bit pulses delivered to each circuit on said modulo 4, a 1 bit remainder line extending from said 1 bit counting circuit, a 2 bit remainder line extending from said 2 bit counting circuit, a second output line extending from a portion of said 1 bit circuit, intermittently operated means for connecting said second output line to the input of said 2 bit circuit for conducting any two 1 bit values stored therein through said 2 bit circuit as a single 2 bit pulse, said last-named 2 bit value being effective to operate said 2 bit circuit and divide an accumulated 2 bit value, if any, in said 2 bit circuit on said modulo 4, and means for testing said 1 and 2 bit remainder lines for any stored remainders in both circuits.

6. A bit count generating circuit for dividing all bit counts on a predetermined modulo and storing any remainder, comprising a 1 bit counting circuit having bit count accumulating portions, means for directing 1 bit values to said circuit, means within said 1 bit circuit for accumulating and dividing all 1 bit values delivered thereto on said predetermined modulo, a 1 bit remainder line extending from said 1 bit counting circuit, a 2 bit counting circuit, means for directing all 2 bit values to said circuit, means within said 2 bit circuit to accumulate and divide the same on said predetermined modulo, means for intermittently connecting the portion of the 1 bit circuit having accumulated two 1 bit values to said 2 bit circuit as a single pulse to provide a 2 bit to said circuit, a 2 bit remainder line extending from said 2 bit circuit, and means for testing said 1 and 2 bit remainder lines for a bit count remainder.

7. In a bit count counting and dividing circuit based on modulo 4, the combination of a 1 bit counting circuit having 1 and 2 bit storage stages, a 2 bit counting circuit, means for directing all 1 bit values to said 1 bit circuit, means for consecutively counting and storing the first three bits in said 1 and 2 bit stages, said circuit being operative upon the reception of the fourth bit to cancel the three accumulated bits to divide the same based on said modulo 4, means for counting and storing the first of each 2 bit value delivered to said 2 bit circuit and for canceling said stored 2 bit by restoring said 2 bit circuit upon the reception of a second 2 bit value to provide division on said modulo 4, a receiver, an output conductor for transmitting any 1 bit value stored in said 1 bit stage to said receiver, an output for said 2 bit storage stage in said 1 bit circuit, means for selectively connecting said output for said 2 bit storage stage to the input of said 2 bit circuit to feed therethrough, an outlet conductor for transmitting any 2 bit value stored in said 2 bit circuit representing a 2 bit remainder to said receiver, and means for intermittently connecting said 1 and 2 bit conductors to said receiver for the transmission of any bit count remainders stored in said 1 and 2 bit count circuits.

8. A bit count generating and dividing circuit based on modulo 4 for storing any remainder based on said modulo, comprising a source of data, means for translating the data into 1 or 2 bit pulses, first and second 1 bit count storing tubes, means for interconnecting said tubes to define a 1 bit counting circuit, means for directing all 1 bit pulses to said first tube in said 1 bit counting circuit for storage, said first tube being operative after receiving the first bit to transfer the same and the next bit to said second tube to store the first two 1 bit pulses therein, said first and second 1 bit count tubes being operative after four 1 bit pulses to divide the same on said modulo 4 to provide a 0 bit count remainder, means including a 1 bit count remainder line extending from said first tube circuit over which 1 bit count remainders are transmitted, a 2 bit tube circuit, means for directing all 2 bit values translated from the data through said 2 bit tube circuit for storage therein, said 2 bit tube being operative upon the application of each second pulse to cancel the stored 2 bit value based on said modulo 4, means for selectively connecting said second 1 bit tube to said 2 bit tube circuit to pulse the same if a stored 2 bit value is stored in said second 1 bit tube and for dividing any 2 bit values stored in said 2 bit circuit on said modulo 4, and means including a 2 bit remainder line extending from said 2 bit tube circuit over which 2 bit count remainders are transmitted.

9. The combination as claimed in claim 8 including a receiver, means operative for transmitting the bit count remainder to said receiver after the selective connection of said second 1 bit tube and said 2 bit tube circuit, said 1 bit remainder, if any, being conducted over said 1 bit remainder line and said 2 bit remainder, if any, extending over said 2 bit remainder line, and means for canceling the stored bit count remainders, if any, in both tube circuits.

10. A bit counting circuit to divide modulo 4 transmitted bit counts and to store any remainder, comprising a pair of 1 bit triggers, a 2 bit trigger, means for selectively operating said 1 bit triggers in accordance with 1 bit values received thereby, means for selectively operating said 2 bit trigger in accordance with 2 bit values received thereby, said 1 and 2 bit triggers independently dividing the 1 and 2 bit values based on said modulo 4, and means for selectively connecting one of said 1 bit triggers to said 2 bit trigger to direct stored two 1 bits to said 2 bit trigger circuit as a single 2 bit pulse.

11. A bit count generating circuit to divide transmitted bit counts modulo 4 and to store the remainder, comprising first and second 1 bit triggers, means for operating said 1 bit trigger in accordance with 1 bit values received thereby, means for counting and storing two 1 bits in said second trigger, said first and second triggers dividing all 1 bits as received based on said modulo 4, a 2 bit trigger, means for operating said 2 bit trigger in accordance with 2 bit values received thereby, said 2 bit trigger including means for storing the first of each 2 bit delivered and for canceling said stored 2 bit upon the reception of a second 2 bit value, a 1 bit count remainder line extending from said 1 bit trigger for transmitting a 1 bit value stored therein, if any, an output connection for said second 1 bit trigger, means for selectively connecting said second 1 bit trigger to the input of said 2 bit trigger to conduct therethrough, and a 2 bit remainder line extending from said 2 bit trigger for conducting a 2 bit value stored therein, if any.

12. The combination as claimed in claim 11 including means for resetting said triggers after said second 1 bit trigger is fed through said 2 bit trigger.

13. A bit counting circuit for a source of data wherein the bit count therefor is transmitted therefrom as separate 1 and 2 bit pulses and divided modulo 4 to provide bit count remainders for transmission to a receiver, comprising a 1 bit counting circuit including first and second 1 bit count triggers, means for connecting said first 1 bit trigger to the source of data, means for directing the 1 bit pulses to said first 1 bit trigger to operate the same, means dependent upon one cycle of operation of said first bit trigger for operating said second 1 bit trigger for storing two 1 bit values in said 1 bit circuit, said first and second 1 bit count triggers being operative after four 1 bit pulses to divide the same on said modulo 4 to provide a 0 bit count remainder, means including a 1 bit count remainder line extending from said first 1 bit trigger over which the 1 bit count remainders are transmitted, a 2 bit trigger, means for directing 2 bit pulses through said 2 bit trigger, said 2 bit trigger being operative upon the application of each second 2 bit pulse to cancel the previously stored 2 bit value based on said modulo 4, a 2 bit count remainder line extending from said 2 bit trigger, means for selectively connecting said second 1 bit trigger to said 2 bit trigger for operating the same as a 2 bit pulse if two 1 bits are stored in said second 1 bit trigger and for dividing any 2 bit value stored therein on said modulo 4, and checking means operative after the selective connection of said second 1 bit trigger and said 2 bit trigger for transmitting the bit count remainders, if any, over said 1 and 2 bit count remainder lines to the receiver.

14. The combination as claimed in claim 13 including means for resetting said triggers to 0 bit count after the bit count remainder lines have been checked for any 1 and 2 bit count remainder.

15. In bit count generating circuits to divide transmitted bit counts modulo 4 and for storing any remainder, the combination of first and second normally "off" 1 bit triggers, means for operating said 1 bit trigger in accordance with 1 bit values received thereby, means dependent upon said first 1 bit trigger for counting and storing two 1 bits in said second trigger by turning the same "on," said first and second triggers dividing all 1 bits as received based on said modulo 4, a normally "off" 2 bit trigger, means for operating said 2 bit trigger in accordance with 2 bit values received thereby, said 2 bit trigger including means for storing the first of each 2 bits delivered by turning said 2 bit trigger "on" and for canceling said stored 2 bit by turning the same "off" upon the reception of a second 2 bit value, 1 bit count remainder line extending from said first 1 bit trigger for transmitting a 1 bit value stored therein when the same is in "on" position, an output connection for said second 1 bit trigger, means for selectively connecting said second 1 bit trigger to the input of said 2 bit trigger to feed therethrough to operate the same if said second 1 bit trigger is "on," a 2 bit count remainder line extending from said said 2 bit trigger for transmitting a 2 bit value stored therein when said trigger is in "on" position, and means for resetting all said triggers to their "off" positions after said second 1 bit trigger has fed through said 2 bit trigger.

16. A bit counting circuit for data wherein the bit count therefor is transmitted as separate 1 and 2 bit pulses and divided modulo 4 to store a bit count remainder for transmission to a receiver, comprising a 1 bit counting circuit including first and second normally "off" 1 bit count triggers, means for coupling the "off" side of said first 1 bit trigger to said second 1 bit trigger, a first inverter, means for coupling said inverter to said first 1 bit trigger, means for directing 1 bit pulses to said first inverter to operate said first 1 bit trigger from "off" to "on" or "on" to "off" position, said coupling between said first and second 1 bit triggers being effective to operate said second 1 bit trigger from "off" to "on" and "on" to "off" for each four pulses to said first 1 bit trigger, the first three 1 bit pulses being stored in said triggers as a 1 and 2 bit when both of said triggers are "on," a 1 bit remainder line extending from the "off" plate side of said first 1 bit trigger, a normally "off" 2 bit trigger, a second inverter coupled to said 2 bit trigger, means for directing 2 bit pulses to said second inverter to operate said 2 bit trigger from "off" to "on" or "on" to "off" position, said 2 bit trigger upon each second operation acting to divide each 2 bit value on said modulo 4, a 2 bit count remainder line extending from the plate circuit of the "off" portion of said 2 bit trigger, a circuit including a switch, means for connecting said second 1 bit trigger to said switch, means operated at predetermined intervals for closing said switch, said switch permitting conduction to said second inverter, said last-named circuit reflecting any two 1 bits stored in said second 1 bit count trigger to operate said 2 bit trigger to add 2 bits or divide any remainder in the 2 bit trigger on said modulo 4, means for connecting said 1 and 2 bit count remainder lines to said receiver, and means for returning said bit count triggers to their "off" positions.

17. A bit counting circuit for data wherein the bit count therefor is transmitted as single 1 or 2 bit pulses and divided modulo 4 to store a bit count remainder for transmission to a receiver, comprising a 1 bit counting circuit including first and second normally "off" 1 bit count triggers, means for capacity coupling the "off" side of said first 1 bit trigger to said second 1 bit trigger, a first inverter, means for capacity coupling the plate of said inverter to said first 1 bit trigger, means for directing 1 bit pulses to said first inverter to operate said first 1 bit trigger from "off" to "on" or "on" to "off" position, said capacity coupling between said first and second 1 bit triggers being effective to operate said second 1 bit trigger from "off" to "on" and "on" to "off" for each four pulses to said first 1 bit trigger, the first three 1 bit pulses being stored in said triggers as a 1 and a 2 bit when both of said triggers are "on," a 1 bit remainder line extending from the "off" plate side of said first 1 bit trigger, a normally "off" 2 bit trigger, a second inverter having a plate circuit capacity coupled to said 2 bit trigger, means for directing 2 bit pulses to said second inverter to operate said 2 bit trigger from "off" to "on" or "on" to "off" position, said 2 bit trigger upon each second operation acting to divide each 2 bit value stored therein on said modulo 4, a 2 bit count remainder line extending from the plate of the "off" portion of said 2 bit trigger, a cathode follower having a grid and a cathode, said grid being connected to the "off" plate side of said second 1 bit trigger, a circuit including a diode switch, means for connecting said cathode to one element of said diode switch, means operated at predetermined intervals for energizing another element of said diode switch to permit conduction to said inverter if said second 1 bit trigger is "on," said last-named circuit reflecting any two 1 bits stored in said second 1 bit count trigger to add 2 bits or to divide any remainder in the 2 bit trigger on said modulo 4, means for connecting said 1 and 2 bit count remainder lines to the receiver, and means for returning said bit count triggers to their "off" positions after delivery of the bit count remainders.

References Cited in the file of this patent

UNITED STATES PATENTS

| | | |
|---|---|---|
| 2,484,115 | Palmer | Oct. 11, 1949 |
| 2,512,851 | Crossman | June 27, 1950 |
| 2,706,597 | Crossman | Apr. 19, 1955 |